United States Patent [19]
Noble

[11] Patent Number: 6,055,645
[45] Date of Patent: Apr. 25, 2000

[54] METHOD AND APPARATUS FOR PROVIDING A CLOCK SIGNAL TO A PROCESSOR

[75] Inventor: James L. Noble, Portland, Oreg.

[73] Assignee: Intel Corporation, Santa Clara, Calif.

[21] Appl. No.: 08/777,522

[22] Filed: Dec. 30, 1996

[51] Int. Cl.[7] .................................................. G06F 1/04
[52] U.S. Cl. .......................................... 713/501; 713/601
[58] Field of Search .................................... 713/500, 501, 713/600, 601

[56] References Cited

U.S. PATENT DOCUMENTS

| | | | |
|---|---|---|---|
| 5,450,574 | 9/1995 | Madter et al. .......................... | 395/560 |
| 5,644,760 | 7/1997 | Polzin et al. ............................ | 395/500 |
| 5,774,701 | 6/1998 | Matsui et al. ........................... | 713/601 |
| 5,889,977 | 3/1999 | Schultz ................................ | 395/500.44 |
| 5,896,513 | 4/1999 | Fisch et al. ............................. | 395/527 |

*Primary Examiner*—Dennis M. Butler
*Attorney, Agent, or Firm*—David J. Kaplan

[57] ABSTRACT

A method and apparatus for providing one of two clock signals to a processor based on a reference signal. An electronic component includes a processor, a first clock source configured to provide a first clock signal, an interface for receiving a second clock signal, and a reference signal line. The first clock signal is applied to the processor if a first reference signal is applied to the reference signal line, and the second clock signal is applied to the processor if a second reference signal is applied to the reference signal line.

22 Claims, 4 Drawing Sheets

METHOD AND APPARATUS FOR PROVIDING A CLOCK SIGNAL TO A PROCESSOR

FIELD OF THE INVENTION

The present invention relates to computer systems and more particularly to a method and apparatus for providing a clock signal to a processor.

BACKGROUND OF THE INVENTION

At the current pace of technological innovation, an electronic device purchased today will likely become obsolete within the next couple of years. This presents a frustrating dilemma to consumers. Rapid obsolescence is perhaps nowhere more apparent than in the personal computer market segment. With new generations of more powerful computers being released every six months to a year, a consumer is wary of paying a premium for a top-of-the-line computer system knowing that in less than a year's time the same computer will be considered old technology, available to consumers at less than half its retail price at introduction.

One way a consumer can protect their investment in a computer system is to purchase a system having a processor that can be upgraded. For example, a consumer could purchase a 486-based computer system operating at 66 MHz, and later, if more power is desired, upgrade their processor to, for example, a 100 MHz 486 processor. For desktop personal computer systems, a consumer may also be able to upgrade their 486 processor-based system to a more powerful, compatible, next generation processor such as a Pentium® processor, available from Intel Corporation. of Santa Clara, Calif. In this manner, some portion of a consumer's initial investment in their desktop computer system is salvaged because the consumer need only purchase a more powerful processor to upgrade their computer system rather than purchasing an entirely new computer system.

Unfortunately, mobile computer systems are not as easily upgradable. Mobile computer systems include, for example, notebook computers, laptop computers, and personal data assistants. In the interest of saving space, the processor, chipset, memory, and various other primary components of the mobile computer system are highly integrated. This high degree of integration makes upgrading any one component of the mobile computer system, such as the processor, technically challenging and expensive, particularly for an upgrade from one processor generation to the next.

For example, FIG. 1 is a prior art computer system in which processor 10 is coupled to and communicates with bridge 12 via host bus 15. Bridge 12 couples processor 10 to peripheral component interconnect (PCI) sockets 1, 2, and 3 by coupling host bus 15 to PCI bus 16. The PCI protocol is described by the *PCI Local Bus Specification,* Revision 2.0 (1993), and Revision 2.1 (1995). In addition, bridge 12 couples main memory 14 to processor 10 and to the PCI sockets, thereby enabling three-way communication between these components. Level-2 cache 11 is coupled to processor 10 by way of another bus. Clock source 13 provides fast and slow clock signals synchronized to each other. The fast clock signals are applied to level-2 cache 11, processor 10, and bridge 12. The slow clock signals are applied to bridge 12 and to PCI sockets 1, 2, and 3, to which PCI compatible external devices are coupled.

Upgrading processor 10 to a faster processor in the same processor family is simply a matter of removing the old processor and inserting a new processor into the same socket. Upgrading to a next generation processor family, however, is more involved. To effectively upgrade the computer system of FIG. 1 to a next generation processor family, level-2 cache 11, processor 10, bridge 12, and possibly clock source 13 may need to be replaced. Replacement of all of these components in a mobile system may wind up costing more than the system itself is worth. In addition, the interconnect routings between these components and their corresponding sockets may not support an upgrade.

SUMMARY OF THE INVENTION

A method and apparatus is described for providing one of two clock signals to a processor based on a reference signal. An electronic component includes a processor, a first clock source configured to provide a first clock signal, an interface for receiving a second clock signal, and a reference signal line. The first clock signal is applied to the processor if a first reference signal is applied to the reference signal line, and the second clock signal is applied to the processor if a second reference signal is applied to the reference signal line.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus is described for providing one of two clock signals to a processor based on a reference signal. For one embodiment of the present invention, the first clock signal is provided by a first clock source residing on the same printed circuit board (PCB) as the processor. The second clock signal is provided by a second clock source residing on a second PCB. When the first PCB is inserted into a socket that electrically couples the first PCB to the second PCB, a reference signal line residing on the first PCB is coupled to circuitry on the second PCB via the socket interface.

If a reference signal applied to the reference signal line from the second PCB indicates that the reference signal line is electrically coupled to the input of a clock source on the second PCB, then the clock source on the first PCB provides its clock signal to the processor. If, on the other hand, a reference signal applied to the reference signal line from the second PCB indicates that the reference signal line is not coupled to the input of a clock source, then the clock source on the first PCB is prevented from providing a clock signal to the processor. Instead, a second clock source on the second PCB provides its clock signal to the processor on the first PCB via the socket interface.

By including not only a clock source and processor on the first PCB but also key components including a level-2 cache and bridge, a mobile computer system designer can create a basic system including a second clock source, main memory, and other components on a second PCB that accepts the first PCB via a socket. In this manner, a flexible mobile computer system can be designed to support any of a number of PCB's that include a processor and its corresponding bridge and cache. For such a system, upgrading from one processor to another is simply a matter of switching the PCB's containing the different processors in the appropriate socket of the basic computer system.

In addition, by providing a clocking scheme in which one of two clock signals are applied to a processor based on a signal applied to a reference signal line, a mobile computer system designer has the flexibility to design a system using synchronous dynamic random access memory (SDRAM), extended data out (EDO) memory, or any other data storage technology for main memory while reducing electromagnetic interference concerns. This flexibility reduces the cost of mobile computer systems by making the system design more generic, and will increase the attractiveness of these mobile computer systems by accommodating processor upgrades. A more detailed description of the present invention, including various configurations and implementations in accordance with alternate embodiments of the present invention, is provided below.

Figure 1:
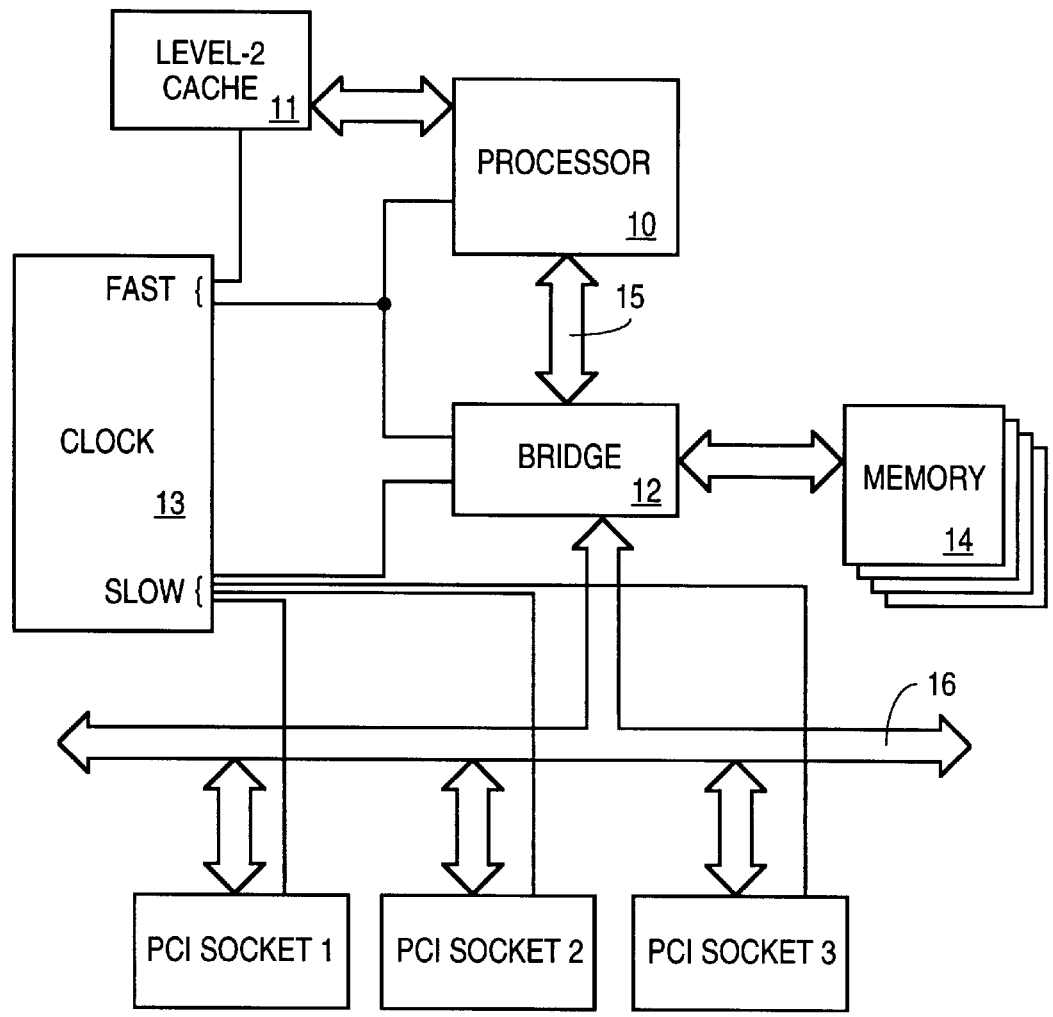
FIG. 1 is a prior art computer system.
Figure 2:
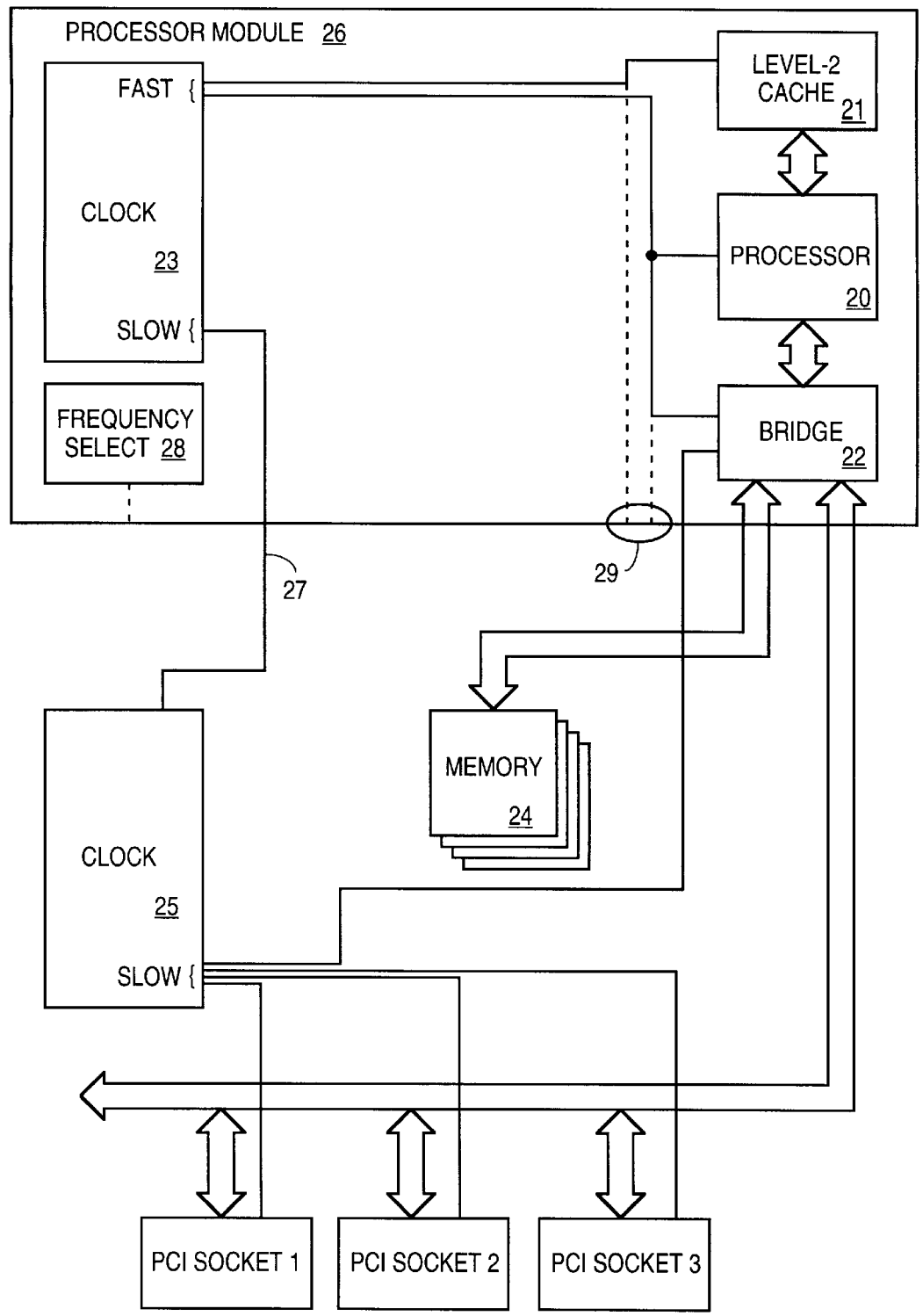
FIG. 2 is a computer system formed in accordance with one embodiment of the present invention.

FIG. 2 is a computer system formed in accordance with one embodiment of the present invention in which processor module 26 is a PCB containing clock source 23, frequency select 28, level-2 cache 21, processor 20, bridge 22, clock interface 29, and associated interconnect lines and interfaces. On one or more separate PCB's of the computer system, clock source 25, main memory 24, and peripheral component interconnect (PCI) sockets 1, 2, and 3 are included, along with their associated interconnect lines. The PCI sockets are interfaces coupled to the PCI bus, extending from bridge 22, through which peripheral devices compliant with the PCI bus protocol communicate with other components of the computer system including, for example, processor 20. For one embodiment of the present invention, the computer system of FIG. 2 is a mobile computer system.

Processor module 26 is an electronic component configured for insertion into a PCB socket interface that accommodates the coupling of signal lines on processor module 26 to corresponding signal lines in the remainder of the computer system. For example, the PCI bus signal lines extend from bridge 22 to interfaces at the edge of processor module 26. These signal lines are electrically coupled to corresponding PCI bus signal lines on one or more other PCB's via a socket interface to permit communication between bridge 22 and PCI compliant components inserted into the PCI sockets. In this manner, bridge 22 is also coupled to the output of clock source 25 and to main memory 24 via the socket interface. The output of clock source 23 is coupled across the socket interface to an input of clock source 25 via clock signal line 27 (also referred to herein as the reference signal line). Processor 20 is coupled to and communicates with bridge 22 via a host bus and is also coupled to and communicates with level-2 cache 21 via the host bus or an alternate bus.

Clock source 23 provides a slow clock signal onto slow clock signal line 27. This slow clock signal is at a lower frequency than the clock signals provided at the fast clock signal output of clock source 23. Clock signal line 27 is routed to an interface at the edge of processor module 26, through the socket coupling processor module 26 to the rest of the computer system, and on to a synchronization input of clock source 25. For this embodiment, clock source 25 is a clock buffer that generates multiple slow clock signals synchronized to the clock signal received via signal line 27. For one embodiment of the present invention, these slow clock signals are PCI clock signals intended for use in synchronizing the exchange of information across the PCI bus. One of the slow clock signals provided by clock source 25 is routed through a clock signal line to bridge 22 on processor module 26 via the socket interface. Each of a plurality of other slow clock signals are routed to the PCI sockets of the computer system as shown.

Slow clock signal line 27 acts as a reference signal line for clock source 23. For one embodiment of the present invention, clock source 23 recognizes when signal line 27 is coupled to clock source 25, and, in response to this recognition, clock source 23 provides the higher frequency fast clock signals, synchronized to the slow clock signal, to level-2 cache 21, processor 20, and bridge 22. For one embodiment of the present invention, the reference signal applied to reference signal line 27 by clock source 25 is the open circuit or high impedance resulting from the coupling of signal line 27 to the control gates of an input buffer at the synchronization input of clock source 25. In accordance with this embodiment, a pass gate or transfer gate is included either in clock source 23 or elsewhere on the processor module, the gate of which is coupled to the reference signal line and is configured to allow the passing of the fast clock signal when the reference signal line is at a high voltage level. A high voltage level is attained by coupling the reference signal line to a voltage supply through a pull-up resistor on the processor module, and taking the output from the node of the resistor furthest from the voltage supply. For another embodiment of the present invention, this reference signal is ground, some other voltage level, or a binary data value sent from clock source 25, along the reference signal line, to the clock source on the processor module.

In accordance with the embodiment of the present invention shown in FIG. 2, signal line 27 doubles as both the slow clock signal line providing the PCI clock signal from clock source 23 to clock source 25, and as the reference signal line providing the reference signal from clock source 25 to clock source 23. For an alternate embodiment of the present invention, a separate reference signal line is coupled to the control gates of buffers through which the fast clock signal lines providing the fast clock signal from the clock source to the other components of the processor module are routed. For this embodiment, the clock source of the processor module provides the fast and slow clock signals but the fast clock signals are intercepted at the buffers. The buffers either allow or disallow the fast clock signals from being applied to the level-2 cash, processor, and bridge depending upon the reference signal applied to the reference signal line from control circuitry residing off the processor module.

Figure 3:
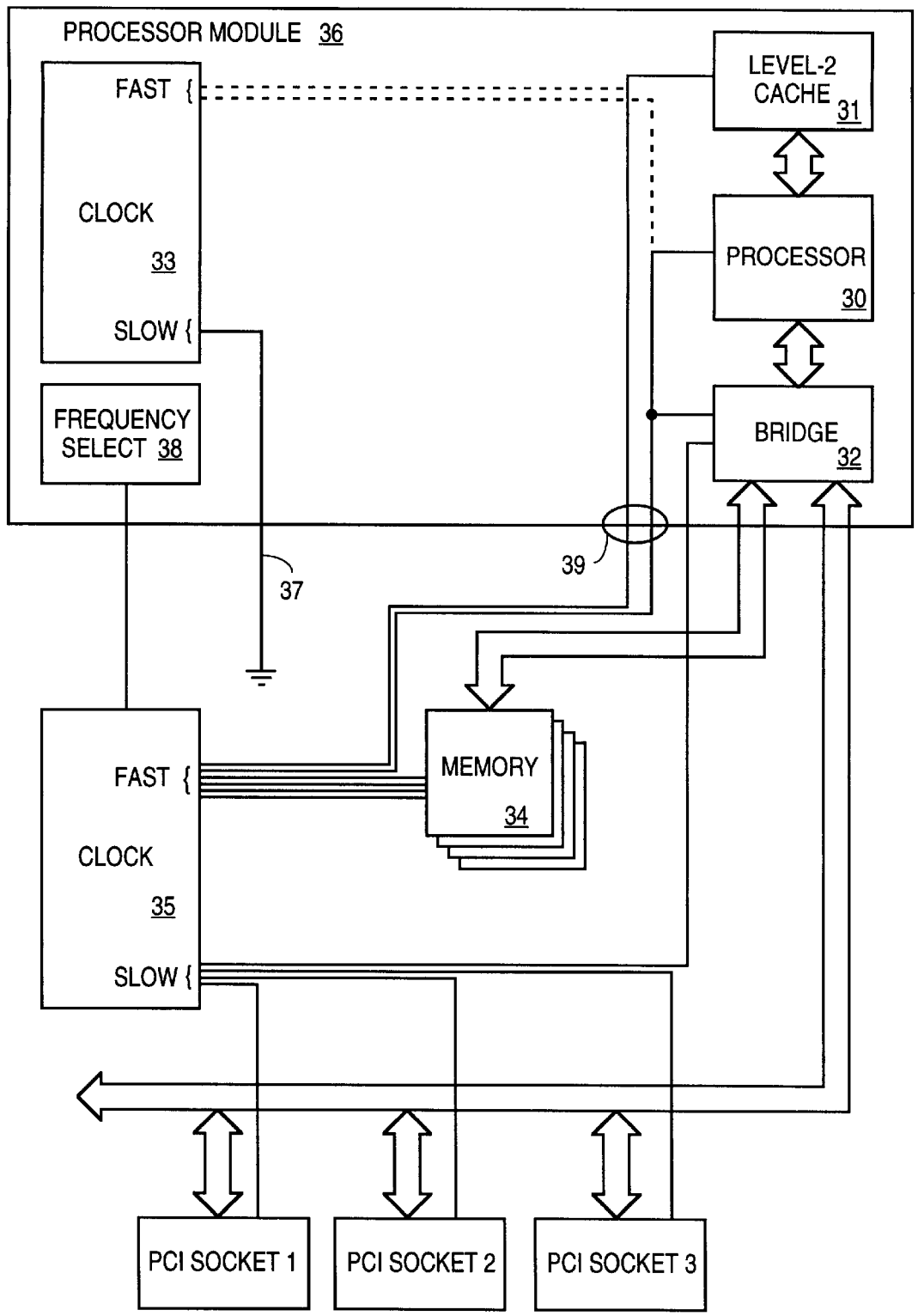
FIG. 3 is a computer system formed in accordance with another embodiment of present invention.

In accordance with the embodiment of the present invention shown in FIG. 2, the clock signal lines coupling level-2 cache 21, processor 20, and bridge 22 to clock interface 29 are left uncoupled to any circuitry in the remainder of the computer system. Similarly the output of frequency select 28 is left uncoupled to any other circuitry. FIG. 3 shows an embodiment in which these signal lines are used.

FIG. 3 is a computer system formed in accordance with another embodiment of the present invention in which processor module 36 comprises clock source 33, frequency select 38, level-2 cache 31, processor 30, and bridge 32. The output of frequency select 38 is coupled to an interface at the edge of processor module 36, as is signal line 37 along with all other signal lines that bridge the connection between processor module 36 and the remainder of the computer system. The fast clock signal output ports of clock source 33 are coupled to the clock inputs of level-2 cache 31, processor 30, and bridge 32. In addition, the clock inputs of level-2 cache 31, processor 30, and bridge 32 are coupled to clock interface 39. Processor 30 is coupled to level-2 cache 31 and bridge 32 via a plurality of signal lines representing a host bus or other bus that enables communication between the components.

Processor module 36 is inserted into a socket that electrically couples signal lines routed to the interfaces at the edge of processor module 36 to corresponding signal lines in the remainder of the computer system. The output of frequency select 38 is coupled to a frequency select input port of clock source 35 via the socket interface. Slow clock signal line 37 of clock source 33 is coupled to ground. Clock inputs of level-2 cache 31, processor 30, and bridge 32 are coupled to the fast clock signal output lines from clock source 35 via the socket coupled to clock interface 39. A plurality of fast clock signal lines are coupled to a plurality of synchronous dynamic random access memory (SDRAM) components of main memory 34. Main memory 34 is also coupled to bridge 32 by way of the main memory bus comprising a plurality of signal lines that cross the socket interface between the processor module and memory 34. Similarly, the PCI sockets are coupled to bridge 32 by way of a PCI bus comprising a plurality of signal lines that span the socket interface. Bridge 32 serves to couple the host bus, through which bridge 32 communicates with processor 30, to both the main memory bus and the PCI bus. A slow, PCI clock signal output line of clock source 35 is coupled to each of the PCI sockets as well as to the PCI clock input of bridge 32.

For the embodiment of FIG. 3, the reference signal applied to reference signal line 37 is, simply, ground. Clock source 33, in response to recognizing that signal line 37 is grounded, turns off the fast clock signal output to the fast clock signal lines thereby preventing a fast clock signal from clock source 33 from being applied to the other components of processor module 36. For one embodiment of the present invention, this is accomplished by including a pass gate or transfer gate, either in clock source 33 or elsewhere on the processor module, the gate of which is coupled to the reference signal line, configured to prevent the passing of the fast clock signal when the reference signal line is grounded. Instead, fast clock signals are applied to the clock inputs of level-2 cache 31, processor 30, and bridge 32 from clock source 35 via clock interface 39 of the interface socket. The frequency of the fast clock signal is determined by a signal sent from frequency select 38 to the frequency select input port of clock source 35. For one embodiment of the present invention, the frequency select signal comprises a binary value indicating that the clock is to provide either a 60 or 66 MHz clock signal to the processor. As is the case for the embodiment of the present invention of FIG. 2, the slow, PCI clock signal applied to the PCI sockets and to the bridge are synchronized to the fast clock signal applied to the clock inputs of the level-2 cache, processor, and bridge.

In accordance with the embodiment of the present invention of FIG. 3, SDRAM memory components are used for main memory 34, requiring that fast clock signals be applied to these components. These fast clock signals are provided by clock source 35. Because SDRAM memory components have tight clock skew tolerances, the fast clock signals supplied to the memory components originate from the same clock source that supplies the fast clock signal to processor 30, thereby reducing the clock skew as compared to an embodiment in which separate clock sources are used for the memory components and the processor. In addition, due to this tight clock skew tolerance, for one embodiment of the present invention the fast clock signal lines coupled to the level-2 cache, processor, bridge, and SDRAM memory components are all approximately the same length.

Note that in accordance with the embodiments of the present invention shown in FIGS. 2 and 3 there are only a few clock signal lines routed from the processor module to the rest of the computer system. This is advantageous for reducing the effects of electromagnetic interference (EMI) when operating the computer system. EMI generation occurs most significantly when clock signals, particularly higher frequency clock signals, are routed over long distances, such as, for example, between a first PCB and a second PCB. In accordance with the embodiment of the present invention shown in FIG. 2, only two lower frequency PCI clock signal lines bridge the interface between processor module 26 and the rest of the computer system. By keeping the higher frequency fast clock signal lines isolated to processor module 26, EMI is suppressed. Similarly, in accordance with the embodiment of the present invention shown in FIG. 3, only two higher frequency fast clock signal lines, along with the single, slow, PCI clock signal line, are routed between processor module 36 and the rest of the computer system. While the fast clock signal lines coupled through clock interface 39 lead to some amount of EMI, the majority of the fast clock signal lines are isolated to the portion of the computer system coupling clock source 35 to main memory 34. Thus EMI is significantly reduced in comparison to an embodiment in which clock source 33 provides the fast clock signals for the components of processor module 36 as well as the SDRAM components of main memory 34.

Figure 4:
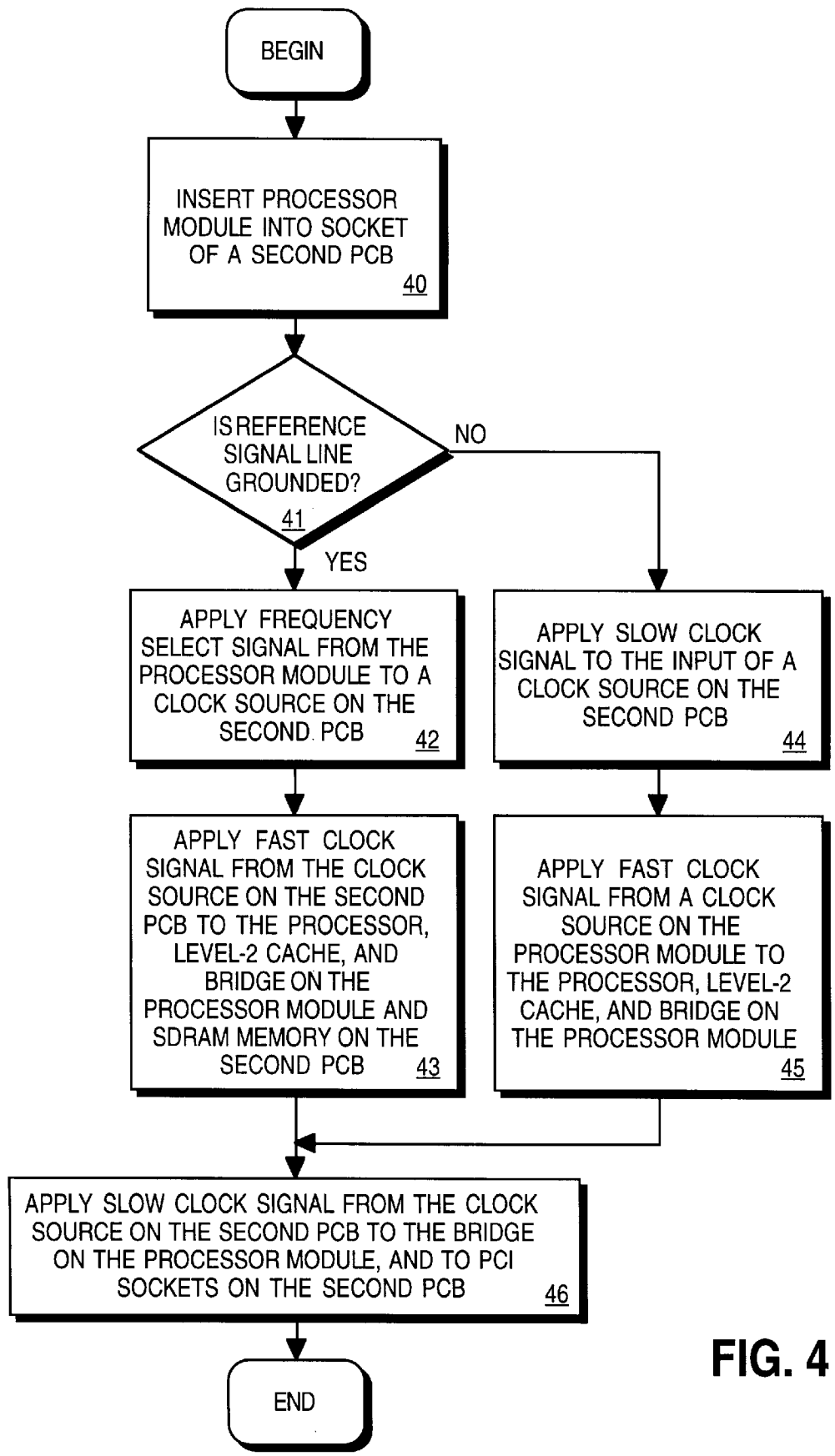
FIG. 4 is a flow chart showing a method of the present invention.

FIG. 4 is a flow chart showing one method of the present invention. At step 40, a processor module is inserted into the socket of a second PCB. For one embodiment of the present invention this processor module is an electronic component that includes a clock source, such as, for example, a clock generator, frequency select circuitry, a level-2 cache, a processor, and a bridge disposed on a PCB. In addition, the processor module includes a reference signal line.

At step 41, circuitry on the processor module determines whether or not the reference signal line on the processor module is grounded by the second PCB. For one embodiment of the present invention, this reference signal line coming from the processor module is a slow, PCI clock signal line from a clock source on the processor module. For another embodiment of the present invention the reference signal line is a separate signal line coupled to circuitry that controls whether or not a fast clock signal is provided by the clock source of the processor module to the clock input of the processor. In accordance with an alternate embodiment of the present invention, determination of which route to take at step 41 is based upon an alternate reference signal which may include, for example, an open circuit, a predetermined voltage applied to the reference signal line, a predetermined current applied to the reference signal line, or a binary data signal sent along the reference signal line.

In accordance with FIG. 4, if it is determined that the reference signal line is grounded, a frequency select signal is applied from the processor module to a clock source on the second PCB at step 42. For one embodiment of the present invention, the frequency select signal selects between 30 or 33 MHz. For another embodiment of the present invention, the frequency select signal selects between 60 and 66 MHz. For one embodiment of the present invention, determination of which of two frequencies is selected is accomplished by sending either a high (logical "1" value) or a low (logical "0" value) value. For other embodiments of the present invention, two or more alternate clock frequencies are selected by the appropriate setting of the frequency select circuitry to send the appropriate frequency select signal to the clock on the second PCB.

Next, at step 43 of FIG. 4, a fast clock signal is applied to the processor, level-2 cache, bridge, and SDRAM memory components from the clock source on the second PCB. For one embodiment of the present invention, this fast clock signal is either 60 or 66 MHz depending upon the value of the frequency select signal. For another embodiment of the present invention, the fast clock signal is an alternate frequency. For one embodiment of the present invention, the fast clock signal is applied to the processor module and bridge via a first fast clock signal line, and is applied to the level-2 cache via a second fast clock signal line.

If it is determined at step 41 of FIG. 4 that the reference signal line is not grounded, then a slow clock signal is applied to the input of a clock source on the second PCB from the processor module at step 44. For one embodiment of the present invention, the clock source is a clock buffer and the slow clock signal is applied to the synchronization input of the clock buffer. This clock buffer then generates multiple copies of the slow clock signal synchronized to the slow clock signal. For one embodiment of the present invention, the slow clock signal is applied to the input of the clock source on the second PCB via the reference signal line. For this embodiment, the reference signal line is coupled to the slow clock output of the clock source on the processor module. For another embodiment of the present invention, the slow clock signal is applied to the input of the clock source on the second PCB via an independent, slow clock signal line, separate from the reference signal line. For one embodiment of the present invention, this slow clock signal is a PCI clock signal at either 30 or 33 MHz For another embodiment of the present invention, this slow clock signal is some alternate frequency.

Next, at step 45 of FIG. 4, a fast clock signal provided by the clock source on the processor module is applied to the processor, level-2 cache, and bridge on the processor module. For one embodiment of the present invention this fast clock signal is either 60 or 66 MHz. For an alternate embodiment of the present invention, a fast clock signal operates at some alternate frequency. For one embodiment of the present invention, the fast clock signal is applied to the processor module and bridge via a first fast clock signal line, and is applied to the level-2 cache via a second fast clock signal line.

At step 46 of FIG. 4, after steps 43 and 45, a slow clock signal provided by the clock source on the second PCB is applied to the bridge on the processor module and to PCI sockets on the second PCB. For one embodiment of the present invention, the slow clock signal is a PCI clock signal operating at either 30 or 33 MHz. For an alternate embodiment of the present invention, the slow clock signal operates at an alternate frequency. In accordance with one embodiment of the present invention, the slow clock signal is synchronized to the fast clock signal regardless of whether the fast clock signal is provided by the clock source on the processor module or the clock source on the second PCB. The selection between the two clock sources is based upon the reference signal applied to the reference signal line.

This invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An electronic component comprising:
   a processor to receive a clock signal operating at a supply frequency;
   a first clock source to provide a first clock signal operating at the supply frequency;
   a clock interface to receive a second clock signal operating at the supply frequency provided by a second clock source; and
   a reference signal line to allow the first clock signal operating at the supply frequency to be applied to the processor in response to a first reference signal applied to the reference signal line, and to prevent the first clock signal from being applied to the processor in response to a second reference signal applied to the reference signal line, allowing the second clock signal operating at the supply frequency to be applied to the processor.

2. The electronic component of claim 1, further comprising a level-2 cache coupled to the processor, a host bus coupled to the processor, and a bridge configured to couple the host bus to a PCI bus.

3. The electronic component of claim 1, wherein the processor, the first clock source, the clock interface, and the reference signal line are disposed on a first, single, printed circuit board.

4. The electronic component of claim 3, wherein the printed circuit board further comprises a level-2 cache coupled to the processor, a host bus coupled to the processor, and a bridge configured to couple the host bus to a PCI bus.

5. The electronic component of claim 3, wherein the second clock source is disposed on a second, separate printed circuit board.

6. The electronic component of claim 1, wherein the first reference signal is that which results from coupling the reference signal line to an open circuit.

7. The electronic component of claim 6, wherein the first clock source is further configured to provide a third clock signal on the reference signal line, the third clock signal operating at a lower frequency than the supply frequency.

8. The electronic component of claim 1, wherein the second reference signal is ground.

9. A mobile computer system comprising:
   a first, single, printed circuit board (PCB);
   a processor to receive a clock signal, the processor disposed on the first PCB;
   a first clock source to provide a first clock signal, the first clock source disposed on the first PCB;
   a second clock source to provide a second clock signal, the second clock source disposed on a second, separate PCB; and
   a reference signal line to allow the first clock signal to be applied to the processor in response to a first reference signal applied to the reference signal line, the first reference signal to be applied to the reference signal line throughout operation of the computer system, and to prevent the first clock signal from being applied to the processor in response to a second reference signal applied to the reference signal line, the second reference signal to be applied to the reference signal line throughout operation of the computer system.

10. The mobile computer system of claim 9, further comprising a level-2 cache coupled to the processor and disposed on the first PCB, a host bus coupled to the processor and disposed on the first PCB, and a bridge configured to couple the host bus to a PCI bus disposed on the first PCB.

11. The mobile computer system of claim 10, wherein the reference signal line is coupled to a synchronization input of the second clock source, the first clock signal is applied to the processor, and the second clock source is further configured to provide a PCI clock signal to the bridge.

12. The mobile computer system of claim 10, wherein the reference signal line is coupled to ground, the second clock signal is applied to the processor, and the second clock source is further configured to provide a third clock signal and a fourth clock signal, the third clock signal being a PCI clock signal applied to the bridge, and the fourth clock signal being applied to a synchronous dynamic random access memory device.

13. The mobile computer system of claim 9, wherein the first clock source is further configured to provide a third clock signal on the reference signal line, the third clock signal being a PCI clock signal.

14. The mobile computer system of claim 9, wherein the second reference signal is ground.

15. The mobile computer system of claim 9, wherein the first reference signal is applied to the reference signal line by coupling the reference signal line to a synchronization input of the second clock source.

16. A method for synchronizing electronic components in a computer system, the method comprising:
  a. coupling a first printed circuit board (PCB) to a second PCB, the first PCB including a first clock source to provide a first clock signal, a processor to receive a clock signal, and a reference signal line, the second PCB including a second clock source to provide a second clock signal;
  b. determining if a reference signal applied to the reference signal line from the second PCB is a first or a second value;
  c. providing the first clock signal to the processor throughout operation of the computer system if the reference signal is determined to be a first value; and
  d. providing the second clock signal to the processor throughout operation of the computer system if the reference signal is determined to be a second value.

17. The method of claim 16, wherein the first PCB further includes a level-2 cache, a host bus coupled to the processor, and a bridge configured to couple the host bus to a PCI bus.

18. The method of claim 17, wherein the reference signal is determined to be the first value, and the second clock source is further configured to provide a PCI clock signal to the bridge.

19. The method of claim 17, wherein the reference signal is determined to be the second value, and the second clock source is further configured to provide a third clock signal and a fourth clock signal, the third clock signal being a PCI clock signal applied to the bridge, and the fourth clock signal being applied to a synchronous dynamic random access memory device.

20. The method of claim 16, wherein the first clock source is further configured to provide a third clock signal on the reference signal line, the third clock signal being a PCI clock signal.

21. The method of claim 16, wherein the reference signal is determined to be the second value when the reference signal line is coupled to ground.

22. The method of claim 16, wherein the reference signal is determined to be the first value when the reference signal line is coupled to a synchronization input of the second clock source.

* * * * *